United States Patent
DiFoggio et al.

(10) Patent No.: US 7,197,195 B2
(45) Date of Patent: Mar. 27, 2007

(54) FIBER OPTICS HEAD UTILIZING RANDOMIZED FIBERS PER SENSOR

(75) Inventors: Rocco DiFoggio, Houston, TX (US); Arnold Walkow, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 128 days.

(21) Appl. No.: 10/918,964

(22) Filed: Aug. 16, 2004

(65) Prior Publication Data

US 2005/0094921 A1 May 5, 2005

Related U.S. Application Data

(60) Provisional application No. 60/495,203, filed on Aug. 14, 2003.

(51) Int. Cl.
*G02B 6/00* (2006.01)
*G02B 6/06* (2006.01)

(52) U.S. Cl. .................. 385/12; 385/116; 356/73.1

(58) Field of Classification Search .............. 385/12, 385/115, 116; 356/73.1; 175/40, 41; 367/82; 250/227.11, 227.14
See application file for complete search history.

(56) References Cited

U.S. PATENT DOCUMENTS 7,038,191 B2 * 5/2006 Kare et al. ............. 250/227.11
2004/0114890 A1 * 6/2004 Tajima ........................ 385/115

FOREIGN PATENT DOCUMENTS

GB 2217838 A 11/1989

* cited by examiner

*Primary Examiner*—Sung Pak
*Assistant Examiner*—Daniel Petkovsek
(74) *Attorney, Agent, or Firm*—Madan, Mossman & Sriram, P.C.

(57) ABSTRACT

The present invention provides an apparatus and method for randomly distributing a number of fibers associated with a spectral channel over an area of an input optics head input window for sensing optical input. The head comprises a plurality of optical channels each channels having a plurality of fibers spread out and intermingled across the input optics head. Thus, a particle or gas bubble passing in front of the input optics head would temporarily affect all channels but only to a small degree since only a portion of fibers for a particular channel would be affected by the temporary passage of the bubble or particle passing in front of a particular region of the optics head input window.

29 Claims, 3 Drawing Sheets

FIBER OPTIC HEAD SPACING

RANDOM DISTRIBUTION FIBER OPTICS HEAD

FIBER OPTICS HEAD UTILIZING RANDOMIZED FIBERS PER SENSOR

CROSS REFERENCE TO RELATED APPLICATIONS

This patent application is related to and claims priority from U.S. patent application No. 60/495,203 filed on Aug. 14, 2003 entitled Fiber Optics Head Utilizing Randomized Fibers Per Sensor by R. DiFoggio and A. Walkow.

FIELD OF THE INVENTION

The present invention relates generally to the field of downhole sampling and in particular to a spatially randomized optical sensor which reduces the effects of bubbles and particles passing by an optical sensor rendering a smoother data pattern for received luminance (fluorescence and transmittance).

SUMMARY OF THE RELATED ART

Typically downhole optical head fibers are collected in a bundle for each channel, which spatially corresponds to a particular point on an optics input window. Thus, a particle or bubble passing by the point on the optics input window corresponding to the particular channel would be greatly affected by a temporary increase or decrease in the amount of light received by the channel. For example a bubble passing in front of a particular channel location would cause a temporary measured rise in transmissivity because a gas bubble has less optical density and passes more light than crude oil or another fluid in which the gas resides. Conversely, a sand particle or other particle passing in front of a particular channel location would cause a temporary measured reduction in transmissivity because a particle has greater optical density and passes less light than crude oil or another fluid in which the particle resides. Thus, there is a need for a new optics sensor head that is less subject to the effects of gas bubbles and particles passing in front of the optics input section of corresponding to a particular channel.

SUMMARY OF THE INVENTION

The present invention addresses the shortcomings of the related art described above. The present invention provides an apparatus and method for distributing a number of fibers associated with an optical spectral channel over an area of an input optics head for sensing optical input. The optical sensing head comprises a plurality of optical channels, each channel having a plurality of fibers spread out and intermingled across the input optics head. The fibers associated with any given channel are evenly or randomly distributed over the input optics head. Thus, a particle or gas bubble passing in front of the input optics head would temporarily affect all channels but only to a small degree since only a portion of fibers for a particular channels would be affected by the temporary passage of the bubble or particle passing by in front of an input fiber.

BRIEF DESCRIPTION OF THE FIGURES

For detailed understanding of the present invention, references should be made to the following detailed description of the preferred embodiment, taken in conjunction with the accompanying drawings, in which like elements have been given like numerals, wherein.

DETAILED DESCRIPTION OF AN EXEMPLARY EMBODIMENT

The present invention provides randomized spatial fiber location for an input optics head for reducing the effect of bubbles and particles passing in front of an optics input window to enable measurement of spectral content to determine or estimate the percent of oil-based mud filtrate contamination in crude oil samples.

Figure 1:
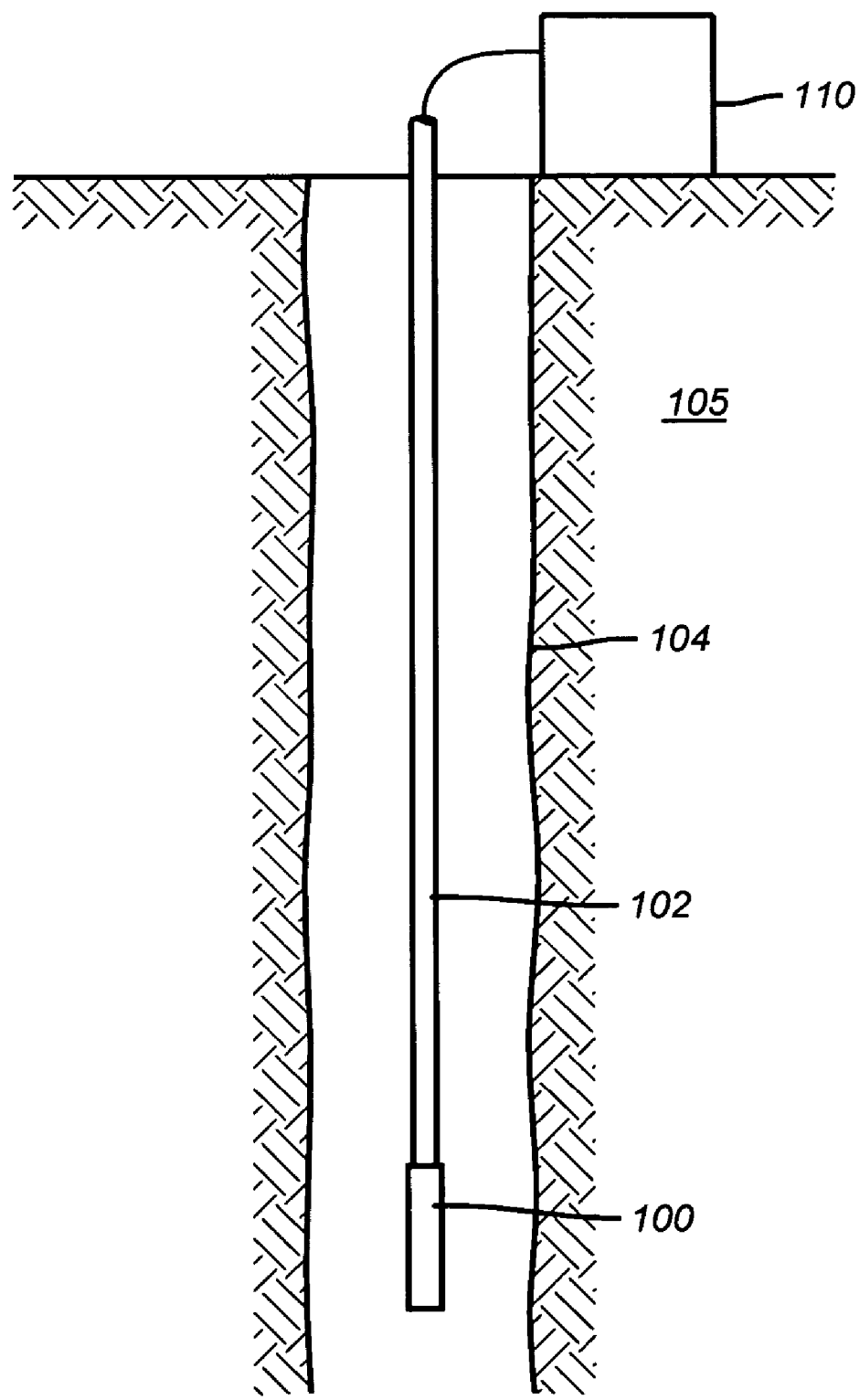
FIG. 1 is a schematic earth section illustrating the invention operating environment.
Figure 2:
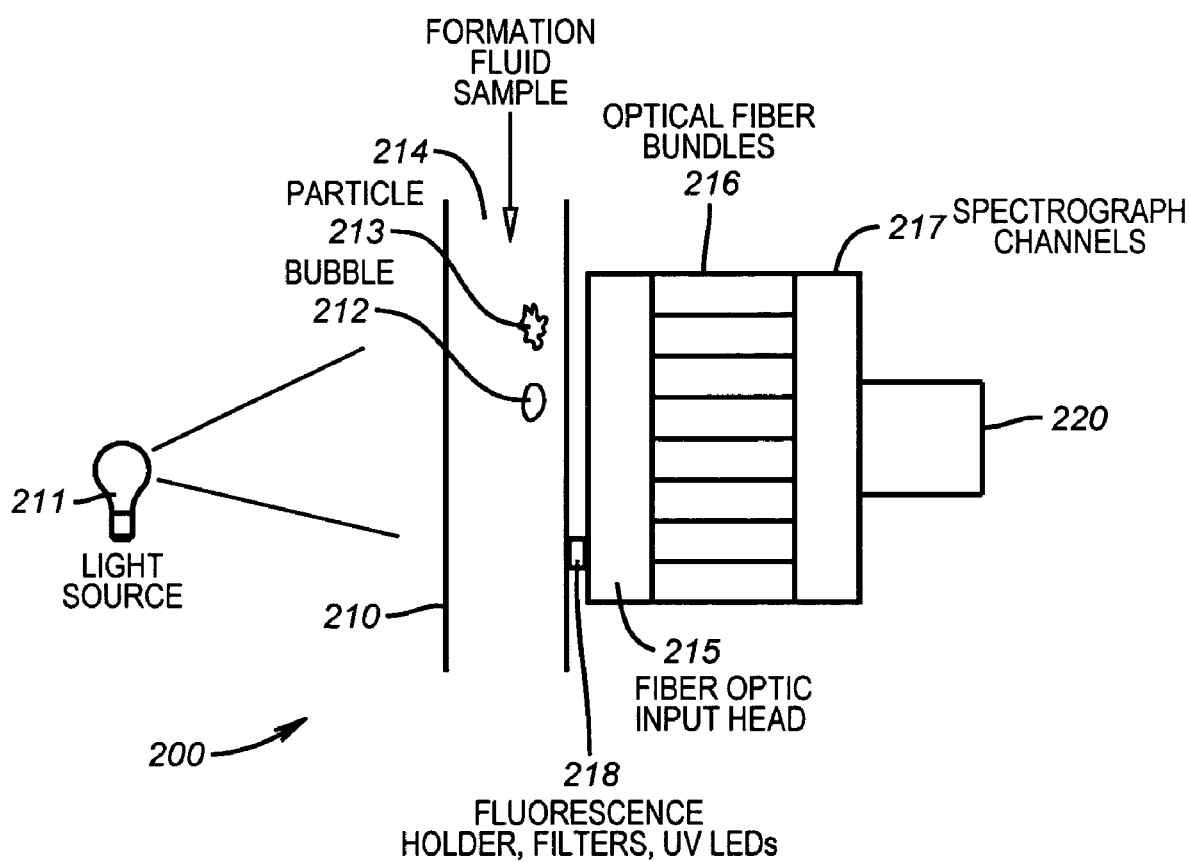
FIG. 2 is a schematic of an optical tool having Fiber Optic input head for sensing light in a down hole optical analysis tool.

FIG. 1 shows the tool 100 in operation downhole deployed in a well bore drilled into a formation 105. Controller processor 110 takes data from the down hole tool 100 and determines parameters of interest for downhole fluids based on measurements of light associated with a down hole fluid or fluid sample. The tool is deployed either from a wire line 102 or a drill string 102. FIG. 2 illustrates an optics input head 215 collecting light from fluorescence, luminance or transmittance associated with a formation fluid sample 214. Particles 213 and gas bubbles 212 flowing in the fluid sample 214 pass by the optics head input window 300. Light is supplied to the sample by light source 211 or UV light source 218 with includes a holder, filters and UV LEDs. Downhole processor 220 having memory and input out put devices takes output from spectrographic channels 217 and determines a parameter of interest for the down hole fluid from the spectral measurements. Such spectral measurements are well known in the art as well as the determination of physical properties of a down fluid based on such measurements, referred to herein as a parameter of interest.

Figure 3:
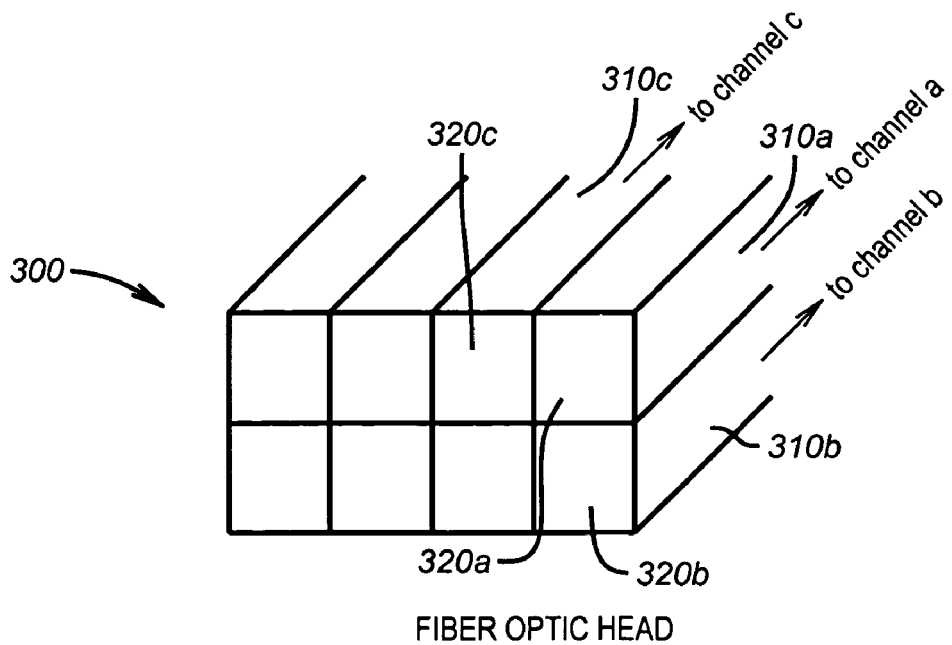
FIG. 3 is a prior art spacing for fiber optic channel bundles on an optics input head.
Figure 4:
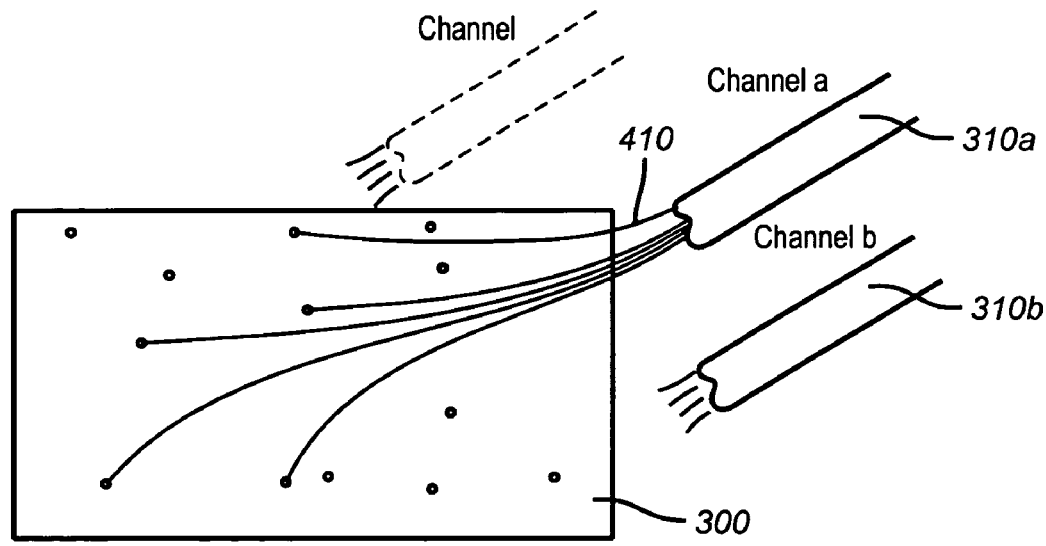
FIG. 4 is an illustration of a distributed spatial arrangement of fibers across an optics input head.

As shown in FIG. 3, prior art optical input heads arrange the optical input fibers 310 associated with a given frequency channel (a, b, c) with a given location (320a, 320b, 320c) on the optical input window 300. Thus, a particle or gas bubble passing by a spot on the window associated with a given channel would have an large effect on that channel only. As shown in FIG. 4, the present invention spatially distributes the fibers associated with a given frequency channel across the optical input window. The fibers associated with all other channels are likewise distributed across the optical input window. All fibers are intermingled so that all fibers from all channels are distributed equally or randomly across the optical input window. Thus, a gas bubble or particle passing in front of the optics input window affects all channels equally and has a minimal effect on any one channel. Thus, the measurements made by the optical head of the present invention are more stable, more reliable and more useful.

In another embodiment, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the preferred embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

The invention claimed is:

1. An apparatus for monitoring a parameter of interest for a downhole fluid comprising:
    a light source for illuminating a downhole fluid; and
    a plurality of detectors, wherein each detector is associated with a spectral channel, and
    a plurality of optical fibers that are distributed to be in optical communication with the illuminated downhole fluid so as to reduce an effect of a moving object on any particular channel.

2. The apparatus of claim 1, wherein the optical fibers associated with each detector are substantially randomly distributed.

3. The apparatus of claim 1, wherein the optical fibers associated with each detector are substantially evenly distributed.

4. The apparatus of claim 1 further comprising an optics input window coupled adjacent the illuminated fluid and coupled to the optical fibers associated wit each detector.

5. The apparatus of claim 1, wherein the light source is at least one of an ultra violet light source and an ultraviolet light emitting diode (LED).

6. The apparatus of claim 5, wherein the detectors collect light from fluorescence associated with the downhole fluid.

7. The apparatus of claim 5, wherein the light detectors collect light from luminance associated with the downhole fluid.

8. The apparatus of claim 5, wherein the light detectors collect light from transmittance associated wit the downhole fluid.

9. The apparatus of claim 1, wherein the light source is deployable down hole by at least one of a wire line and a drill string.

10. A system for monitoring a parameter of interest for a downhole fluid comprising:
    a surface controller for deploying a light source in optical communication with a downhole fluid; and
    a plurality of light detectors, each detector associated with a spectral channel-and a plurality of optical fibers that are distributed in optical communication with the illuminated fluid so as to reduce an effect of a moving object on any particular channel.

11. The system of claim 10, further comprising an input optics window adjacent the illuminated downhole fluid and coupled to optical fibers associated with the detectors.

12. The system of claim 11, wherein the input optics window is evenly divided into sub regions.

13. The system of claim 12, wherein the sub regions are one of: substantially evenly spaced and substantially randomly spaced.

14. The system of claim 10, further comprising:
    a plurality of light detectors, each associated with a separate spectral channel.

15. The system of claim 10, wherein the light source is at least one of an ultra violet light source and a ultraviolet light emitting diode (LED).

16. The system of claim 15, wherein the light detectors collect light from fluorescence associated with the downhole fluid.

17. The system of claim 15, wherein the light detectors collect light from luminance associated with the downhole fluid.

18. The system of claim 15, wherein the light detectors collect light from transmittance associated with the downhole fluid.

19. The system of claim 10, wherein the light source is deployed downhole by at least one of a wire line and a drill string.

20. A method for monitoring a parameter of interest for a down hole fluid comprising:
    illuminating the downhole fluid; and
    detecting light from the fluid using a plurality of light detectors, each detector associated with a spectral channel, and a plurality of optical fibers that are distributed to be in optical communication with the illuminated fluid in a manner that reduces an effect of a moving object in the illuminated downhole fluid.

21. The method of claim 20, further comprising:
    substantially randomly distributing the optical fibers associated with each of the detectors.

22. The method of claim 21, further comprising:
    associating each of the plurality of light detectors wit a separate spectral channel.

23. The method of claim 20, further comprising:
    substantially evenly distributing the optical fibers associated with each of the detectors.

24. The method of claim 22, further comprising:
    providing an optics window adjacent the downhole fluid and coupling the optical fibers associated with each detector to the optics window.

25. The method of claim 20, wherein the light source is at least one of an ultra violet light source and a ultraviolet light emitting diode (LED).

26. The method of claim 25, wherein the light detectors collect light from fluorescence associated with the downhole fluid.

27. The method of claim 25, wherein the light detectors collect light from luminance associated with the downhole fluid.

28. The method of claim 25, wherein the light detectors collect light from transmittance associated with the downhole fluid.

29. The method of claim 20, further comprising deploying the light source downhole by one of a wire line and a drill string.

* * * * *